Nov. 7, 1961 F. W. LIVERMONT 3,007,336
TORQUE MEASURING DEVICE
Filed June 12, 1958 2 Sheets-Sheet 1
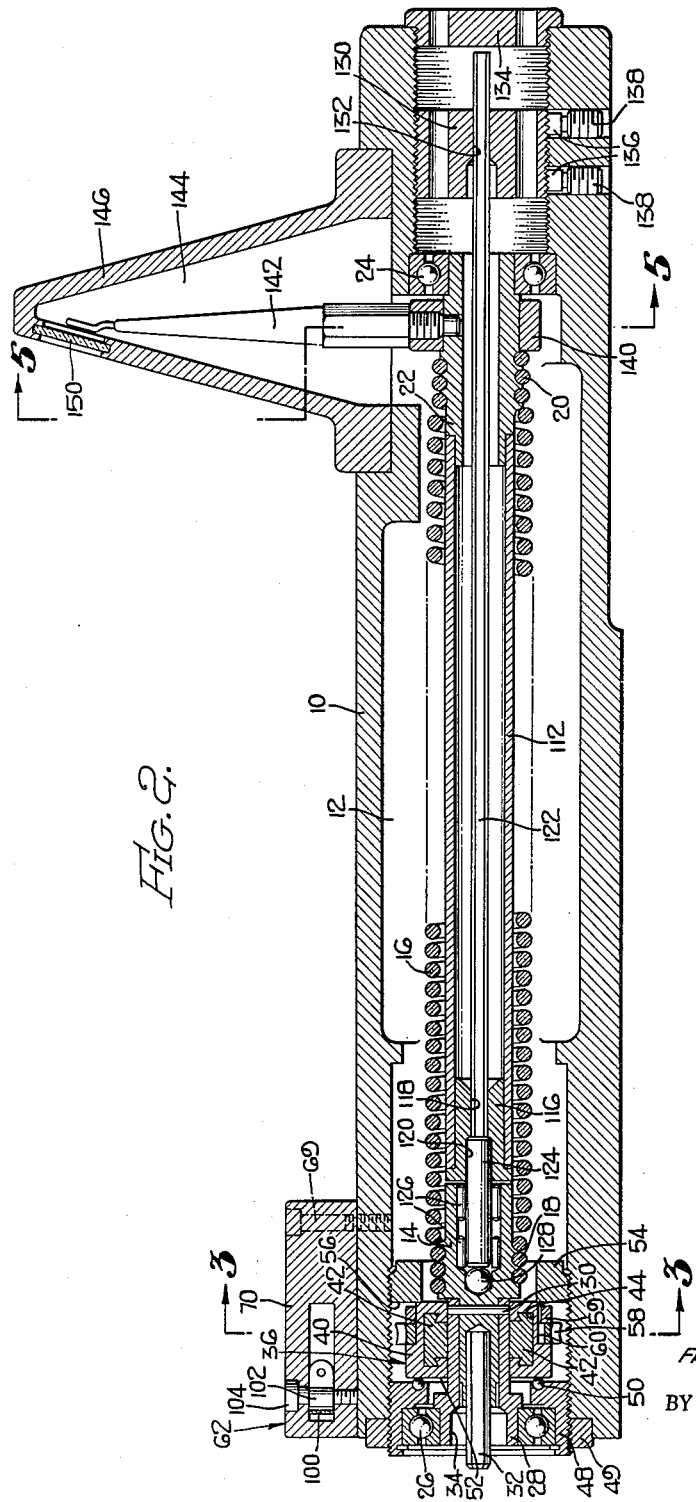
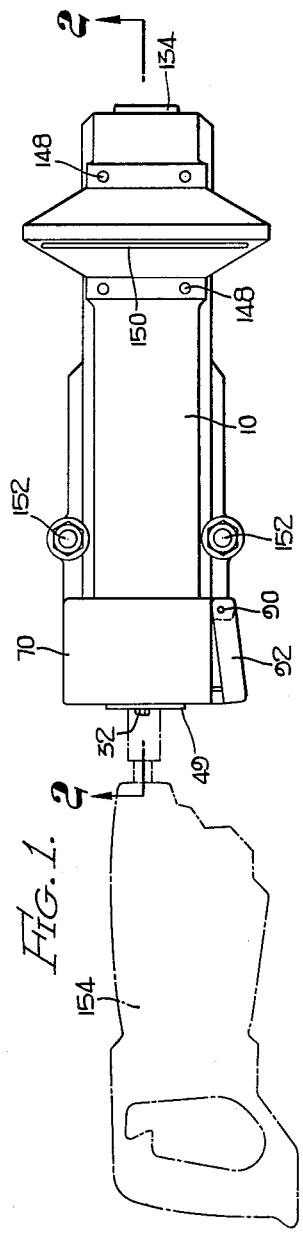
INVENTOR,
FRANK W. LIVERMONT
BY
Lyon & Lyon
ATTORNEYS INVENTOR,
FRANK W. LIVERMONT
BY
Lyon & Lyon
ATTORNEYS

United States Patent Office 3,007,336
Patented Nov. 7, 1961

3,007,336
TORQUE MEASURING DEVICE
Frank W. Livermont, Monrovia, Calif.; Milford S. Zimmerman, executor of said Frank W. Livermont, deceased
Filed June 12, 1958, Ser. No. 741,661
19 Claims. (Cl. 73—134)

This invention relates to apparatus for measuring torque output of power tools such as stall-motor power driven screw drivers, powered nut runners and the like.

The principal object of this device is to provide a torque measuring apparatus for testing torque output of power tools and hand tools which will function over a relatively wide range and with a high degree of accuracy.

Another object is to provide a device of this type which may be used to check torque output of such tools without the necessity of dismantling the tools in any way.

Another object is to provide a torque testing device which is simple in operation, sensitive enough to provide accurate measurements and rugged enough to absorb impacts delivered by nut runners and other impact tools.

Still another object is to provide a device of this type wherein the maximum torque reading obtained in testing the tool may be observed after testing and the device reset to the zero position readily and conveniently.

In devices of this type, a large amount of potential energy is stored after testing a power tool. If this energy is released suddenly with the tool still attached to the device, there is a real danger of the tool being thrown violently from the device. Accordingly, still another object is to provide energy absorbing means which, acting over a relatively long period of time, dissipates the stored potential energy safely.

In the drawings:

FIGURE 1 shows a top plan view of a preferred embodiment of my invention.

FIGURE 2 shows a longitudinal section taken substantially along the lines 2—2 of FIGURE 1.

Figure 3:
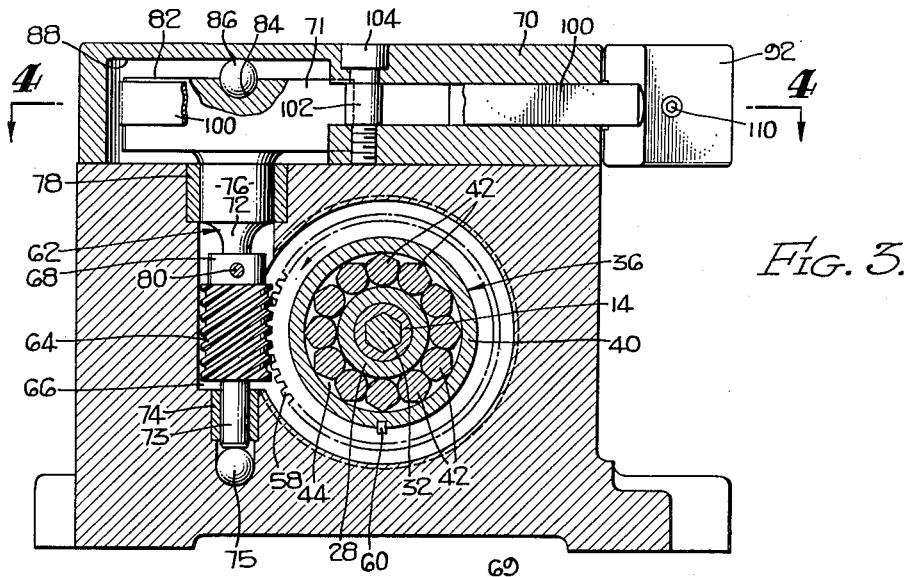
FIGURE 3 is a transverse sectional view taken substantially along the lines 3—3 of FIGURE 2.

Referring to the drawings, the device includes a base 10 which comprises a housing having a central opening 12 extending therethrough. A torque receiving member 14 is mounted to turn within the housing. A coil spring 16 has one end 18 fixed to the member 14 and the other end 20 fixed to the indicator member 22. The latter member is mounted coaxially of the member 14 and spaced therefrom. A bearing assembly 24 rotatably supports the member 22 within the base 10. A similar bearing assembly 26 rotatably supports the sleeve 28 and this sleeve is fixed to the torque receiving member 14 by means of a cross pin 30. A driving post 32 which may be hexagonal in shape is fixed to the torque receiving member 14 and extends into a cavity 34 provided within the sleeve 28.

Means are provided for preventing turning movement of the torque receiving member 14 in one direction and, as shown in the drawings, these means include a one-way clutch assembly generally designated 36. This assembly includes a shell or housing 40 and a series of cam elements 42 arranged in the annular space 44 between the parts 28 and 40.

The particular construction of the one-way clutch assembly 36 is conventional and may be purchased, for example, from the Morse Chain Company of Detroit, Mich.

When the torque receiving member 14 is turned in a clockwise direction, as viewed in FIGURE 3, the cam elements 42 drive the outer part 40 in the same direction. However, the cam elements 42 cannot drive the outer part 40 in the other direction. The result is that when the housing 40 is held stationary against movement, the torque receiving member 14 is free to turn in a clockwise direction, but is prevented by the cam elements 42 from turning in a counterclockwise direction.

The supporting collar 48 which carries the bearing assembly 26 is threaded into the base 10 and screwed in position by means of the lock nut 49. This supporting collar 48 carries a ball bearing assembly 50 which is adapted to engage the forward end 52 of the housing 40 of the one-way clutch assembly 36. A clamping nut 54 is threaded into the base 10 and one side 56 of the clamping nut abuts against and positions the clutch assembly 36.

Encircling the outer member 40 of the clutch assembly 36 is a worm gear 58 held in place by collar 59. Relative movement between the outer member 40 and the gear 58 is prevented by the interlocking key 60. As shown in FIGURE 3, counterclockwise motion of the clutch assembly 36 and the gear 58 is prevented by a brake assembly indicated generally at 62. The brake assembly includes a worm 64 which meshes with the gear 58. The worm 64 is housed in the opening 66 within the base 10 and has a collar 68 at one end thereof.

Secured by threaded bolts 69 to the top of the base 10 is a flywheel housing 70 within which is positioned a flywheel 71. The flywheel has a projecting shaft 72 which passes through a suitable axial bore in the worm 64. One end 73 of the shaft is rotatably mounted in a bearing 74 and is in point contact with a ball 75. The enlarged end 76 of the shaft 72 is rotatably mounted in a bearing 78. The shaft 72 is secured to the worm 64 by means of a pin 80 in the collar 68. One side 82 of the flywheel 71 is provided with a centrally positioned recess 84 which carries a ball 86 which in turn is in point contact with one side 88 of the flywheel housing 70. By this construction the flywheel 71 which carries the worm 64 is mounted between the balls 75 and 86 providing substantially frictionless rotation. Further, the flywheel housing, flywheel and worm are readily removable from the base 10.

Adjacent the flywheel housing 70 and secured thereto by a pivot pin 90 is a release handle 92. The flywheel housing is provided with a bore 94 which is substantially perpendicular to the release handle 92. The release handle 92 is further provided with a recess 96 which is substantially coaxial with the bore 94. A spring 98 is housed within the bore 94 and engages the recess 96. This spring urges the release handle away from the flywheel housing 70.

Figure 4:
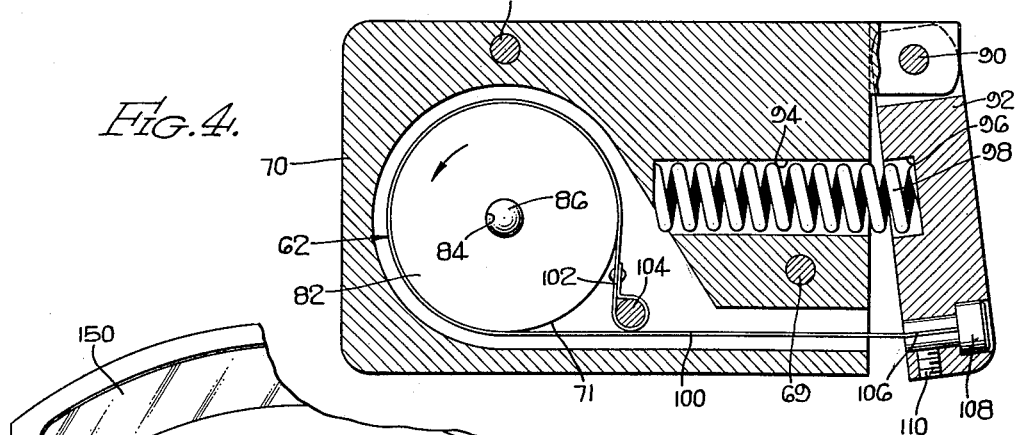
FIGURE 4 is a transverse sectional detail of the brake assembly and is taken substantially along the lines 4—4 of FIGURE 3.

Encircling the flywheel 71 is a brake band 100. One end 102 of the brake band 100 is secured by suitable means to a pin 104 threadedly engaging the flywheel housing 70. The other end 106 is secured to a pin 108 positioned within one end of the release handle 92. The pin 108 is locked in position by a set screw 110 carried by the release handle 92. By this construction, as seen in FIGURE 4, counterclockwise rotation of the flywheel 71 is prevented by the brake band 100 so long as the release handle 92 is forced away from the flywheel housing 70 by the spring 98. When the release handle is depressed in a direction to compress spring 98 the brake band 100 releases the flywheel 71 permitting the worm 64 and thus the gear 58 and torque receiving member 14 to turn in a counterclockwise direction.

A tube 112 is fixed to the indicator member 22 and extends axially within the spring 16. The other end of the tube 112 is fixed to the bushing 116 which is provided with a hexagonal opening 118 and a cylindrical counterbore 120. A hexagonal torsion bar 122 is received within the hexagonal opening 118 and is provided with an integral cylindrical head 124. The cylindrical head 124 projects into the counterbore 120 and is received by the needle bearings 126 provided in the counterbore 120 of the torque receiving member 14. The extreme end of the cylindrical head 124 has a point contact with the ball 128.

The torsion bar 122 extends axially through the interior of the tube 112 and through the interior of the coil spring 16 and passes through a central opening in the indicator member 22.

A stationary part 130 is mounted by means of threads on the base 10 and is provided with a central hexagonal opening 132 which slidably receives the hexagonal torsion bar 122. A plug 134 closes the end of the threaded opening in base 10 but has clearance with respect to the end of the bar 122. The stationary part 130 is maintained in selected position by means of the plugs 136 and the set screws 138.

A collar 140 is mounted on the indicator member 22 and this collar carries a pointer 142 which turns with the member 22. The pointer moves in an arc within an enclosure 144 provided by the member 146 and this member 146 is attached to the base 10 by means of threaded fastenings 148. An arcuate transparent window 150 is provided on the member 146 and this window may carry a scale or other suitable indicia calibrated in units of torque.

The spring 16 provides a "soft" drive so that the torque absorbing member 14 may be driven at relatively high speed while permitting the driven member to turn relatively slowly. In the proportions of the parts shown in the drawings, the torque receiving member 14 may turn approximately five full turns in order for the pointer 142 to reach full scale position on the dial 150.

In operation, the base 10 is bolted down to a support (not shown) by means of a fastening 152. A power nut runner or other power torque tool 154 is engaged with the hexagonal driving post 32. Power is then applied to the tool and the torque output is shown accurately by the position of the pointer 142 with relation to the scale on the transparent window 150. The torque applied by the power tool 154 to the post 32 is carried through the member 14 to the coil spring 16 and thence to the indicator member 22. Reistance to turning movement of member 22 and its associated pointer 142 is developed by the torsion bar 122 which is driven from the member 22 via the tube 112. Locating the torque bar 122 and the tube 112 within the outline of the coil spring 16 shortens the overall length required for the device.

When the pointer 142 comes to rest, the power is shut off to the tool 154. The tool 154 is then withdrawn axially and disengaged from the post 32. The pointer reading 142 remains at the highest point. The pointer 142 returns to its initial position only after manual actuation of the release handle 92 against the force of the spring 98. This manual action releases the brake band 100 and thereby permits the one-way clutch assembly 36 to spin counterclockwise and drive the flywheel 71 through the worm gearing 58 and 64.

During testing, the torque receiving member turns clockwise through only a few revolutions but the amount of energy stored in the spring 16 and bar 122 may be very large. When the brake band 100 releases the flywheel 71, the assembly 36 spins counterclockwise to return the torque receiving member 14 to its rest position. By this action the flywheel is set rapidly in motion to absorb the stored energy and since the housing 40 is free to rotate counterclockwise while the brake is released, the housing 40 may continue rotation after the member 14 has come to rest. Reapplication of the brake brings the flywheel to a stop.

Accordingly, release of the energy stored within the system may be controlled to prevent damage of the device and to eliminate the possibility of the tested tool being separated violently from the testing device.

Figure 5:
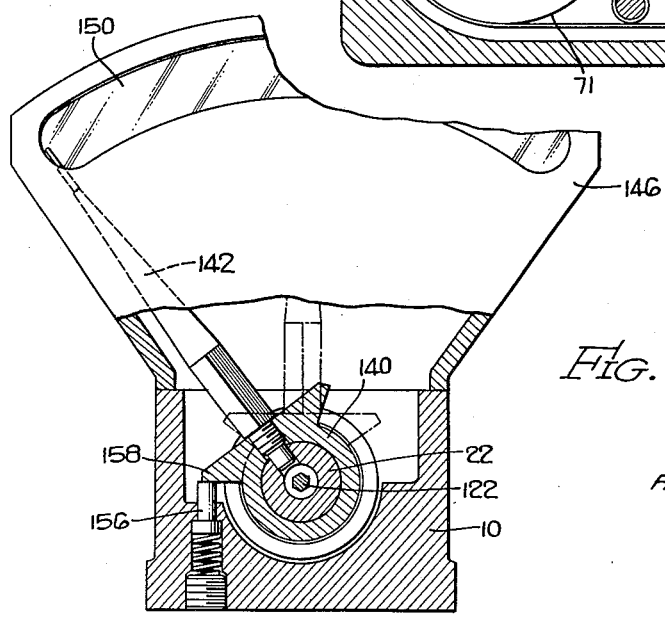
FIGURE 5 is an elevation, partly in section and partly broken away, on the lines 5—5 as shown in FIGURE 2.

A spring loaded bumper pin 156 is provided on the base 10 as shown in FIGURE 5 and is engaged by a shoulder 158 on the collar 140 in a manner to cushion the return of the pointer 142 to its initial position.

Since the flywheel housing 70, the flywheel 71 and the worm 64 may be disengaged from the casing 10, the testing device may be accurately calibrated in a ready and convenient manner.

This application is a continuation-in-part of my copending application, Serial No. 606,253, filed August 27, 1956, now abandoned.

Having fully described my invention, it is to be understood that I do not wish to be limited to the details set forth, but my invention is of the full scope of the appended claims.

I claim:

1. In a torque measuring device of the class described, a combination of: a torque receiving member; an indicator member spaced therefrom; means supporting the members for turning movement about a common axis; a coil spring operatively connecting the members; a stationary part; and a torsion bar operatively connecting the indicator member to the stationary part.

2. In a torque measuring device of the class described, a combination of: a torque receiving member; an indicator member; means supporting the member for turning movement about a common axis; a relatively pliant torsion element operatively connecting the members; a stationary part; resilient means connected to the stationary part opposing movement of the indicator member; and releasable means preventing turning movement of the torque receiving member in one direction.

3. In a torque measuring device of the class described, a combination of: a torque receiving member; an indicator member spaced therefrom; means supporting the members for turning movement about a common axis; a coil spring operatively connecting the members; a stationary part; a relatively stiff torsion element operatively connecting the indicator member to the stationary member; and releasable means preventing turning movement of the torque receiving member in one direction.

4. In a device for measuring the torque output of a rotary tool, the combination of: a base; a member adapted to be driven by the tool; means on the base for mounting the member for turning movement; a coil spring having one end fixed to said member; an indicator member mounted for turning movement on the base coaxially of the first said member, and having the other end of the coil spring fixed thereto; a torsion bar extending axially of the first said member, one end of the torsion bar being driven by the first said member; a stationary part on the base slidably engaging the other end of the torsion bar to prevent turning movement thereof; and means operatively connected to said indicator member to indicate turning movement thereof.

5. In a device for measuring the torque output of a rotary tool, the combination of: a base; a member adapted to be driven by the tool; means on the base for mounting the member for turning movement; a coil spring having one end fixed to said member; an indicator member mounted for turning movement on the base coaxially of the first said member, and having the other end of the coil spring fixed thereto; a torsion bar extending axially of the first said member, one end of the torsion bar being driven by the first said member; a stationary part on the base slidably engaging the other end of the torsion bar to prevent turning movement thereof; and releasable means preventing turning movement of the first said member in one direction.

6. In a torque measuring device of the class described, a combination of: a base; a torque receiving member; an indicator member; means on the base supporting the members for turning movement about a common axis; a relatively pliant torsion element operatively connecting the members; a stationary part; and a relatively stiff torsion element operatively connecting the indicator member to the stationary part, the pliant torsion element encircling at least a portion of the stiff torsion element.

7. In a torque measuring device of the class described, a combination of: a base; a torque receiving member; an indicator member; means on the base supporting the members for turning movement about a common axis; a relatively pliant torsion element operatively connecting the members; a stationary part mounted for axial adjustment on the base; and a relatively stiff torsion element operatively connecting the indicator member to the stationary part.

8. In a torque measuring device of the class described, a combination of: a torque receiving member; an indicator member spaced therefrom; means supporting the members for turning movement; a coil spring operatively connecting the members; resilient means opposing movement of the indicator member; and releasable means preventing turning movement of the torque receiving member in one direction.

9. In a torque measuring device of the class described, the combination of: a torque receiving member; means for mounting the member for turning movement; releasable means for preventing turning movement of said member in one direction; a coil spring having one end fixed to said member; an indicator member mounted for turning movement and having the other end of the coil spring fixed thereto; a torsion bar extending centrally through the interior of the coil spring; means whereby one end of the torsion bar is driven by the latter said member; and stationary means slidably engaging the other end of the torsion bar to prevent turning movement thereof.

10. In a torque measuring device of the class described, the combination of: a torque receiving member; means for mounting the member for turning movement; releasable means for preventing turning movement of said member in one direction; a coil spring having one end fixed to said member; an indicator member mounted for turning movement and having the other end of the coil spring fixed thereto; a drive tube extending within the coil spring and having one end fixed to the indicator member; a torsion bar driven by the other end of the tube and extending centrally through the interior of the tube; and stationary means slidably engaging the torsion bar at a location remote from its driving connection with the tube.

11. In a torque measuring device of the class described, the combination of: a base; a torque receiving member; means on the base for mounting the member for turning movement; a releasable one-way clutch assembly on the base for preventing turning movement of said member in one direction; a coil spring having one end fixed to said member; an indicator member mounted for turning movement on the base and having the other end of the coil spring fixed thereto; a torsion bar extending centrally through the interior of the coil spring; means whereby the torsion bar is driven by the latter said member; and stationary means slidably engaging the torsion bar at a location remote from the latter said means.

12. In a torque measuring device of the class described, the combination of: a base; a torque receiving member; means on the base for mounting the member for turning movement; releasable means for preventing turning movement of said member in one direction, said means including a one-way clutch assembly having a driven outer part encircling said member, and means for releasably connecting the outer part to the base; a coil spring having one end fixed to said member; an indicator member mounted for turning movement on the base and having the other end of the coil spring fixed thereto; a torsion bar driven by the latter said member; and stationary means engaging the torsion bar.

13. In a torque measuring device of the class described, a combination of: a torque receiving member; an indicator member; means supporting the members for turning movement about a common axis; a relatively pliant torsion element operatively connecting the members; a stationary part; resilient means connected to the stationary part opposing movement of the indicator member; and releasable means preventing turning movement of the torque receiving member in one direction, said releasable means including energy absorbing means responsive to turning movement of the torque receiving member in the opposite direction.

14. In a torque measuring device of the class described, a combination of: a torque receiving member; an indicator member spaced therefrom; means supporting the members for turning movement about a common axis; a coil spring operatively connecting the members; a stationary part; a relatively stiff torsion element operatively connecting the indicator member to the stationary member; and releasable means preventing turning movement of the torque receiving member in one direction, said releasable means including energy absorbing means responsive to turning movement of the torque receiving member in the opposite direction, and braking means for controlling the rotation of the energy absorbing means.

15. In a torque measuring device of the class described, a combination of: a torque receiving member; means for mounting the member for turning movement; clutch means for controlling the turning movement of said member; energy absorbing means operatively connected to the clutch means responsive to turning movement of the torque receiving member in one direction; braking means for controlling motion of the energy absorbing means; a coil spring having one end fixed to said member, an indicator member mounted for turning movement and having the other end of the coil spring fixed thereto, a torsion bar extending centrally through the interior of the coil spring, means whereby one end of the torsion bar is driven by the latter said member, and stationary means slidably engaging the other end of the torsion bar to prevent turning movement thereof.

16. In a torque measuring device of the class described, a combination of: a base; a torque receiving member; means on the base for mounting the member for turning movement; means including a one-way clutch assembly for controlling the turning movement of the member, said clutch assembly having a driven outer part encircling said member; energy absorbing means operatively connected to the clutch means responsive to turning movement of the torque receiving member in one direction, said energy absorbing means including a rotatable flywheel operatively connected to the outer part and a braking member releasably engaging the flywheel to control the rotary motion thereof; a coil spring having one end fixed to said torque receiving member, an indicator member mounted for turning movement on the base and having the other end of the coil spring fixed thereto, a torsion bar driven by said indicator member, and stationary means engaging the torsion bar.

17. In a torque measuring device of the class described, a combination of: a base; a torque receiving member; means on the base for mounting the member for turning movement; means including a one-way clutch assembly for controlling the turning movement of said member, said clutch assembly having a driven outer part encircling said member; releasable energy absorbing means responsive to turning movement of said member in one direction, said absorbing means including a driving gear connected to said outer part, a driven gear housed within an opening in said base and connected to said driving gear, a flywheel housing secured to said base, a flywheel housed within said housing connected to said driven gear, releasable braking means including a brake band encircling said flywheel carried by said housing, said driven gear, housing and flywheel being removable from said base; a coil spring having one end fixed to said member; an indicator member mounted for turning movement on the base and having the other end of the coil spring fixed thereto; a torsion bar driven at one end by the latter said member; and stationary means engaging the torsion bar at the other end.

18. In a device for measuring the torque output of a rotary tool, the combination of: a base; a member adapted to be driven by the tool; means on the base for mounting the member for turning movement; a coil spring having one end fixed to said member; an indicator member mounted for turning movement on the base coaxially of the first said member, and having the other end of the coil spring fixed thereto; a torsion bar extending axially of the first said member, one end of the torsion bar being driven by the first said member; a stationary part on the base slidably engaging the other end of the torsion bar to prevent turning movement thereof; clutch means for controlling the turning movement of the first said member; energy absorbing means operatively connected to the clutch means responsive to the turning movement of the first said member in one direction; a releasable braking means for controlling the motion of the energy absorbing means.

19. In a torque measuring device of the class described, a combination of: a base; a torque receiving member; means for mounting the member for turning movement; means including a one-way clutch assembly for controlling the turning movement of said member, said clutch assembly having a driven outer part encircling said member; releasable energy absorbing means responsive to turning movement of said member in one direction, said absorbing means including a driving gear connected to said outer part, a driven gear housed within an opening in said base and connected to said driving gear, a flywheel housing secured to said base; a flywheel housed within said housing connected to said driven gear; releasable braking means including a brake band encircling said flywheel carried by said housing, said driven gear, housing and flywheel being removable from said base; a coil spring having one end fixed to said member; an indicator member mounted for turning movement and having the other end of the coil spring fixed thereto; a drive tube extending within the coil spring and having one end fixed to the indicator member; a torsion bar driven by the other end of the tube and extending centrally through the interior of the tube; and stationary means slidably engaging the torsion bar at a location remote from its driving connection with the tube.

References Cited in the file of this patent

UNITED STATES PATENTS

| | | |
|---|---|---|
| 774,931 | Bucknam | Nov. 15, 1904 |
| 1,120,838 | Miller | Dec. 15, 1914 |
| 2,404,029 | Birk | July 16, 1946 |
| 2,417,402 | Storrie | Mar. 11, 1947 |
| 2,614,418 | Shaff | Oct. 21, 1952 |

FOREIGN PATENTS

| | | |
|---|---|---|
| 341,420 | France | June 9, 1904 |
| 745,891 | Germany | Dec. 2, 1944 |